United States Patent [19]
Pohl

[11] 4,020,548
[45] May 3, 1977

[54] FORMING AND STRIPPING OF CONDUCTORS

[75] Inventor: Herbert Adolf Pohl, Rariton County, N.J.

[73] Assignee: Western Electric Company, Inc., New York, N.Y.

[22] Filed: Aug. 25, 1976

[21] Appl. No.: 717,783

[52] U.S. Cl. .............. 29/630 R; 29/427; 51/324; 81/9.51
[51] Int. Cl.² .......................................... H01R 9/00
[58] Field of Search ............ 29/628, 630 R, 203 R, 29/203 D, 624, 426, 427; 81/9.5, 9.51; 51/324; 174/72 R, 72 TR, 117 R, 117 F, 117 FF; 72/186, 196; 156/47, 50

[56] References Cited

UNITED STATES PATENTS

| 404,581 | 6/1889 | Wheeler | 51/324 |
|---|---|---|---|
| 1,257,394 | 2/1918 | Reynolds | 174/72 TR X |
| 1,801,311 | 4/1931 | Johnson | 81/9.51 X |
| 2,433,346 | 12/1947 | Deakin | 174/72 TR X |
| 3,615,283 | 10/1971 | Lang | 29/624 |
| 3,636,991 | 1/1972 | Webster | 140/105 |

FOREIGN PATENTS OR APPLICATIONS 382,329 10/1932 United Kingdom .......... 174/72 TR

*Primary Examiner*—James R. Duzan
*Attorney, Agent, or Firm*—A. S. Rosen

[57] ABSTRACT

One or more projections are formed, and insulation is stripped, at interconnection areas along one or more conductors, e.g., plural conductive paths in a flat flexible cable, employing apparatus which comprises three rotary members. One or more protuberances on a first rotary member cooperate with a compliant backing surface on a second rotary member so as to form a projection in a conductor about each protuberance. Continued rotation of the first rotary member brings the insulation on each projection into contact with an abrasive surface on the third rotary member, while the protuberance on the first rotary member, about which the projection has been formed, serves as a backing surface to maintain the shape of the projection as the insulation is removed by the abrasive surface.

8 Claims, 4 Drawing Figures

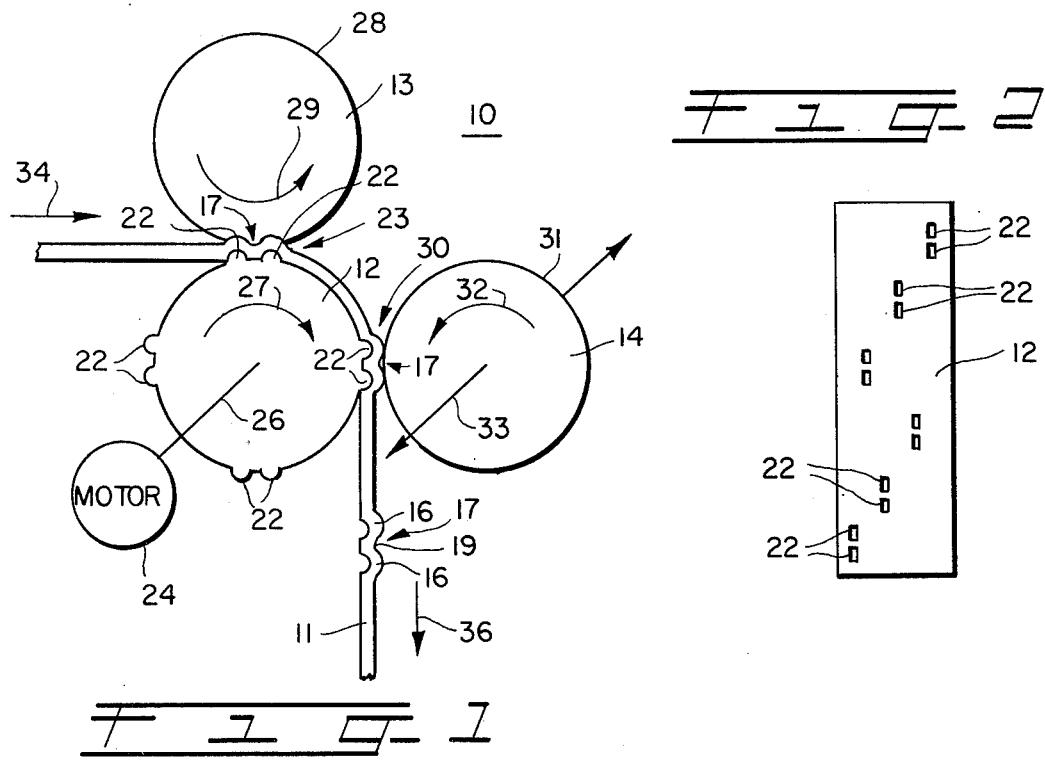
FIG. 1
FIG. 2
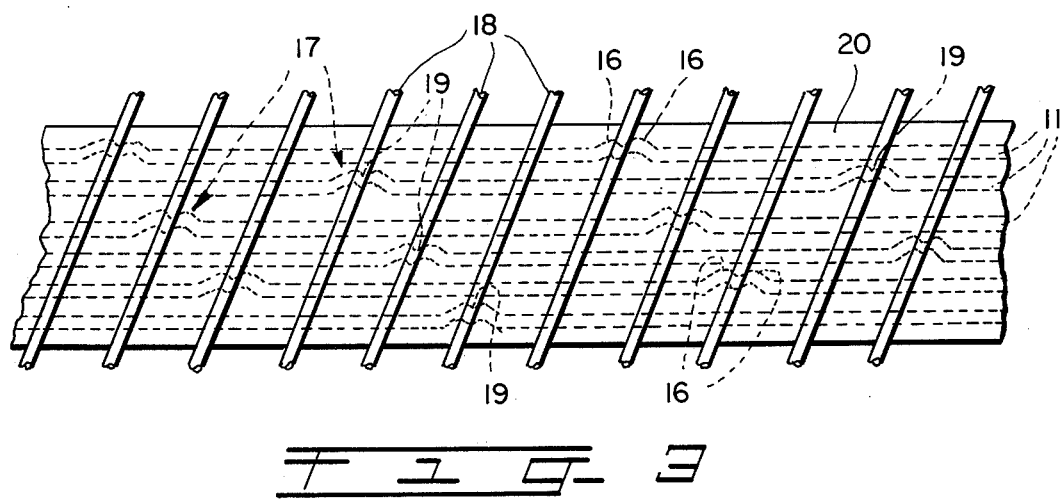
FIG. 3
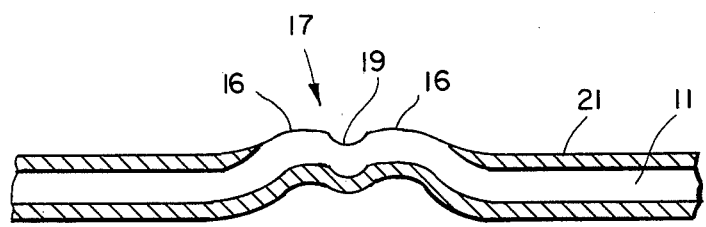
FIG. 4

FORMING AND STRIPPING OF CONDUCTORS

BACKGROUND OF THE INVENTION

1. Field of the Invention

This invention relates to methods for forming a projection on a conductor, and for stripping an insulation covering from the conductor; and, more particularly, to methods for forming one or more projections at an interconnection area along an elongated insulated conductor, and for removing the insulation from the conductor at the interconnection area.

2. Description of the Prior Art

It is known to employ electrical conductors, such as plural, parallel-extending, conductive paths in a flat flexible cable, in which interconnection areas along one or more conductive paths include projections extending transversely to a major portion of the conductive path or paths. Such projections serve to facilitate the interconnection, e.g., by soldering, of additional conductors or terminals, one at each such area. Any insulation is, of course, stripped at the areas selected for interconnection. Some examples of the described conductor structures are disclosed in U.S. Pat. Nos. 782,391 to A.P. Hanson; 1,054,784 and 1,104,061, both to F. R. McBerty; 2,433,346 to G. Deakin; 3,197,555 to S. Mittler; and 3,615,283 to D. D. Lang.

A technique for forming a projection at an interconnection area along a conductor, at which interconnection area an insulation covering, extending over other areas along the conductor, is removed, is disclosed in U.S. Pat. No. 1,801,311 to G. T. Johnson. The Johnson patent reveals a pair of rotary members which include cooperating male and female die portions in the respective rotary members. As the two rotary members are rotated, an insulated wire is fed between them, the die portions on the rotary members functioning to form the desired projections in the insulated wire. The cooperative action between the mating die portions is effective also to strip the insulation from the wire about the projections.

The Johnson technique appears adequate for the forming of projections in, and the stripping of, a single insulated wire. However, the technique is not well suited for use in operating on plural conductor structures, such as flat flexible cable, where various interconnection areas at different axial positions along different conductive paths may be involved. Any such use of cooperating male and female die portions on a pair of rotary members, in processing conventional types of flat flexible cable, would tend to result in fracture of the cable insulation not only in the vicinity of a projection formed in a single conductive path at which stripping is desired, but also extending laterally across the cable to one or more additional conductive paths, and, perhaps, all of the conductive paths. Such additional fracture of the cable insulation, even if not occurring during the forming and stripping operation, would likely take place during subsequent processing or use of the cable. An improved technique for forming projections in, and stripping insulation from, interconnection areas along conductors, better suited to use in operating on conventional types of flat flexible cable, would clearly be advantageous.

Summary of the Invention

The invention contemplates methods for so operating on an elongated insulated conductor as to form a projection at an interconnection area along the conductor and to remove the insulation from the conductor at the interconnection area, wherein the projection forming and insulation removing operations take place at different locations. More particularly, the method of the invention involves the engagement with the interconnection area along the conductor, in a forming location, of a protuberance shaped to form a projection in the conductor about the protuberance; the advancement of the protuberance, with the projection retained thereon, into an insulation removing location spaced from the forming location; and the removal of the insulation from the conductor at the interconnection area while the protuberance, with the projection retained thereon, is disposed in the insulation removing location.

A preferred apparatus for performing the method of the invention comprises a first rotary member having a protuberance for engaging the interconnection area along the conductor; a second rotary member mounted adjacent to the first rotary member in such position that the conductor will be fed into a forming location between the first and second rotary members upon rotation of the first rotary member, the second rotary member including a surface region cooperative with the protuberance on the first rotary member to form a projection at the interconnection area along the conductor about the protuberance as the protuberance traverses the surface region in the forming location; means for removing the insulation from the conductor at the interconnection area in an insulation removing location adjacent to the first rotary member and spaced from the forming location; and means for rotating the first rotary member so as to feed the interconnection area along the conductor into both the forming location and the insulation removing location. More particularly, a set of three rotary members may be employed, the first rotary member including one or more protubernces; the second rotary member including a compliant backing surface cooperative with each protuberance to form a projection; and the third rotary member including an insulation removing surface, e.g., an abrasive surface, effective to strip the insulation from each projection upon rotation of the first rotary member from the forming location into the insulation removing location with the projection retained on the protuberance. Thus, it may be noted that each prouberance on the first rotary member serves first to form a projection at an interconnection area along the conductor, then to aid in feeding the projection into the insulation removing location, and finally to provide a backing surface against which the removal of the insulation may occur without any deformation of the projection.

BRIEF DESCRIPTION OF THE DRAWING

FIG. 1 of the drawing is a partly schematic, side elevational view of apparatus for performing the method the principles of the invention by so operating on an elongated insulated conductor as to form one or more projections at interconnection areas along the conductor and to remove the insulation from the conductor at each such interconnection area, the apparatus preferably including three rotary members;

FIG. 2 is an end elevational view of one of the rotary members which may be utilized in the apparatus of FIG. 1, the illustrated rotary member being particularly suited to forming projections in, and removing the insulation from, interconnection areas at different axial positions along different, parallel-extending conductive paths forming portions of a flat flexible cable;

FIG. 3 is an isometric view of a section of a flat flexible cable after processing by the apparatus FIGS. 1 and 2, showing the manner in which additional conductors or terminals may be interconnected with the various conductive paths of the cable; and FIG. 4 is a side elevational view, partly in section, of a portion of one of the conductors of the flat flexible cable of FIG. 3, and of adjacent portions of an insulation covering on the conductor, in the vicinity of one of the interconnection areas along the conductor.

DETAILED DESCRIPTION

Referring initially to FIG. 1 of the drawing, an apparatus 10 for operating on an elongated insulated conductor 11, such as a conductive path in a flat flexible cable, preferably includes first, second and third rotary members 12, 13 and 14, respectively. It is desired that one or more projections 16 be formed in the conductor 11, in one or more interconnection areas 17, at each of which areas 17 the conductor 11 is to be interconnected, e.g., by soldering, to an additional conductor or terminal 18 (FIG. 3). Thus, the projections 16 may be formed in pairs of adjacent projections 16, with a raised notch 19 located between the projections 16 of each pair as best seen in FIG. 4 of the drawing, such that interconnection may occur at the raised notch 19. It is, of course, also desired that any insulation covering on the conductor 11 be removed from the conductor 11 at each interconnection area 17. The finished product, after passage through the apparatus 10 and upon interconnection with the additional conductors or terminals 18, may resemble the flat flexible cable 20, a section of which is depicted in FIG. 3 of the drawing. As may be observed in FIG. 4, an insulation covering 21 has been removed from each of the projections 16, and the raised notch 19 between the projections 16, at each interconnection area 17.

Turning now additionally to FIG. 2 of the drawing, the first rotary member 12 includes a number of protuberances 22 extending radially therefrom. The protuberances 22 are arrayed in a pattern corresponding to an arrangement selected for the projections 16 at the interconnection areas 17 along the various conductors 11. Thus, each protuberance 22 may be employed to form one of the projections 16 in one of the conductors 11 at an interconnection area 17 therealong upon such rotation of the first rotary member 12 as will feed the interconnection area 17 into a forming location 23 (FIG. 1) between the first and second rotary members 12 and 13, respectively. A suitable motor 24, and a drive system represented simply by the shaft 26 in FIG. 1, may, for example, be operated to provide the desired rotation of the first rotary member 12, e.g., in the direction of arrow 27 about an axis defined by the shaft 26.

The second rotary member 13 includes a surface region 28, extending about the circumference of the second rotary member 13, which is formed of a compliant material, such as hard rubber. The surface region 28 provides a compliant backing surface cooperative with each protuberance 22 on the first rotary member 12 to form the projection 16 at the associated interconnection area 17 upon the feeding of the interconnection area 17 between the first and second rotary members 12 and 13, respectively, in the forming location 23. The common engagement of the two rotary members 12 and 13 with opposite surfaces of the flat flexible cable 20 will result in rotation of the second rotary member 13 in the direction of arrow 29 upon rotation of the first rotary member 12 in the direction of arrow 27.

The third rotary member 14 is so positioned relative to the first rotary member 12 as to define an insulation removing location 30 between the rotary members 12 and 14. Such insulation removing location 30 is preferably spaced from the forming location 23 along the direction of rotation of the first rotary member 12 indicated by arrow 27. The third rotary member 14 may have an abrasive outer surface 31 which is so disposed as to contact the insulation covering each projection 16 at each interconnection area 17 along each conductor 11, and to abrade off such insulation as the interconnection area 17 passes through the insulation removing location. The protuberance 22 on the first rotary member 12, about which the projection 16 will have been formed, will meanwhile serve to provide a backing surface against which the abrasive surface 31 may operate without deformation of the projection 16. The third rotary member 14, which will rotate in the direction of arrow 32 as the conductor 11 is fed between the rotary members 12 and 14 upon continuing rotation of the first rotary member 12, should, of course, be so adjusted as to assure removal of the insulation 21 from the raised notch 19 between the projections 16 on the conductor 11 if the structure of FIG. 4 is to be provided. The third rotary member 14 is preferably also adjustable axially, as suggested by arrow 33 (FIG. 1), in order to adjust the axial position or positions of contact between the abrasive surface 31 and the succession of projections 16 on the cable 20 so as to minimize and/or compensate for wear of the abrasive surface 31.

With reference now to the operation of the apparatus 10, a leading portion (not shown) of a single conductor 11 or of a flat flexible cable 20 is initially fed, e.g., manually into the forming location 23 between the first rotary member 12 and the second rotary member 13. Rotation of the first rotary member 12 in the direction of arrow 27, accompanied by rotation of the second rotary member in the direction of arrow 29, e.g., due to the operation of the motor 24, then causes the conductor 11 or cable 20 to continue to be fed into the forming location 23, as indicated by arrow 34. As each protuberance 22 on the first rotary member 12 engages a conductor 11, in a position which defines an interconnection area 17, a projection 16 is formed about the protuberance 22 due to the compliancy of the backing surface region 28 on the second rotary member 13.

Continued rotation of the first rotary member 12 in the direction of the insulation removing location 30, as indicated by arrow 27, advances each successive projection 16, retained on its respective protuberance 22, into engagement with the abrading surface 31 on the third rotary member 14 at the insulation removing location 30. Thus, the insulation 21 is removed or stripped from the conductor 11 at each interconnection area 17, with the protuberance 22 serving as a backing surface so as to maintain the shape of the projection 16 during the abrasion operation. The finished product, fed from the apparatus 10 in the direction of arrow 36, is now of the type shown in FIGS. 3 and 4 of the drawing.

It is to be understood that the described methods are simply illustrative of preferred embodiments of the invention. Many modifications may, of course, be made in accordance with the principles of the invention.

What is claimed is:

1. A method of so operating on an elongated insulated conductor as to form a projection at an interconnection area along the conductor and to remove the insulation from the conductor at said interconnection area, the method comprising the steps of:
   a. in a forming location, engaging with said interconnection area along the conductor, a protuberance shaped to form a projection in the conductor about the protuberance; then
   b. advancing said protuberance, with the projection retained thereon, into an insulation removing location spaced from said forming location; and then
   c. removing the insulation from the conductor at said interconnection area while said protuberance, with the projection retained thereon, is disposed in said insulation removing lcoation.

2. A method as set forth in claim 1, further comprising:
   d. in said forming location, and during the performance of said step (a), engaging with a surface of the conductor opposite to said interconnection area along the conductor, a compliant backing member cooperative with said protuberance to form the projection in the conductor about said protuberance.

3. A method as set forth in claim 1, said step (c) further comprising:
   d. in said insulation removing location, abrading off the insulation covering the projection at said interconnection area along the conductor by contacting therewith an abrasive surface having relative movement with respect to the projection, said protuberance serving as a backing member for maintaining the shape of the projection in the conductor during the abrading operation.

4. A method as set forth in claim 1, adapted to form a plurality of projections in said conductor at said interconnection are, said step (a) further comprising:
   d. in said forming location, engaging with the conductor at said interconnection area a plurality of protuberances, each of said protuberances being shaped to form a projection thereabout.

5. A method as set forth in claim 1, wherein steps (a) and (b) further comprise:
   d. rotating a rotary member, having said protuberance extending radially therefrom, about an axis in such manner as to advance said protuberance, first into said forming location, and then into said insulation removing location.

6. A method as set forth in claim 5, adapted to form insulation free projections at selected interconnection areas along a plurality of parallel-extending conductors, said step (d) further comprising:
   e. rotating said rotary member, said rotary member having a plurality of protuberances extending radially therefrom in a pattern corresponding to the arrangement of said selected interconnection areas along said plurality of parallel-extending conductors, about said axis in such a manner as to advance said protuberances sequentially, first into said forming lcation, and then into said insulation removing location.

7. A method as set forth in claim 5, further comprising:
   e. in said forming location, and during the performance of said step (a), engaging with a surface of the conductor opposite to said interconnection area along the conductor, a second rotary member having a compliant, circumferential, backing surface cooperative with said protuberance to form the projection in the conductor about said protuberance.

8. A method as set forth in claim 5, said step (c) further comprising:
   e. contacting with the insulation covering the projection at said interconnection area along the conductor, while the projection is retained on said protuberance in said insulation removing location, an abrasive, circumferential surface on an additional rotary member, said protuberance serving as a backing member for maintaining the shape of the projection in the conductor during the abrading operation.

* * * * *